(12) United States Patent
Bark et al.

(10) Patent No.: US 11,407,267 B2
(45) Date of Patent: Aug. 9, 2022

(54) SILENCER FOR LEAF SPRING FOR COMMERCIAL VEHICLE

(71) Applicants: Hyundai Motor Company, Seoul (KR); Kia Motors Corporation, Seoul (KR); SUNG RHIM T&T CO., LTD, Daegu (KR)

(72) Inventors: Ga Ram Bark, Hwaseong-si (KR); Dong Ill Jung, Hwaseong-si (KR); Dong Jin Yeo, Hwaseong-si (KR); Kwang Seok Jeong, Daegu (KR); Tae Heui Lee, Gimpo-si (KR)

(73) Assignees: HYUNDAI MOTOR COMPANY, Seoul (KR); KIA MOTORS CORPORATION, Seoul (KR); SUNG RHIM T&T CO., LTD, Daegu (KR)

( * ) Notice: Subject to any disclaimer, the term of this patent is extended or adjusted under 35 U.S.C. 154(b) by 106 days.

(21) Appl. No.: 16/882,898

(22) Filed: May 26, 2020

(65) Prior Publication Data
US 2021/0155065 A1 May 27, 2021

(30) Foreign Application Priority Data
Nov. 25, 2019 (KR) .......................... 10-2019-0152209

(51) Int. Cl.
*B60G 15/06* (2006.01)
*B60G 11/38* (2006.01)
*B60G 11/02* (2006.01)

(52) U.S. Cl.
CPC .............. *B60G 15/06* (2013.01); *B60G 11/02* (2013.01); *B60G 11/38* (2013.01); *B60G 2202/30* (2013.01); *B60G 2206/428* (2013.01); *B60G 2206/8106* (2013.01); *B60G 2800/162* (2013.01)

(58) Field of Classification Search
CPC .... B60G 15/06; B60G 11/38; B60G 2202/30; B60G 2206/428; B60G 2206/8106; B60G 2800/162; B60G 2202/143; B60G 2204/4502; B60G 11/02; B60G 2204/41; B60G 2202/11; B60G 2204/121; B60G 2206/73; B60G 2206/82092;
(Continued)

(56) References Cited

U.S. PATENT DOCUMENTS

| 6,832,773 | B2 * | 12/2004 | Yokoyama | ............... F16F 1/182 |
| | | | | 280/124.171 |
| 9,285,004 | B2 * | 3/2016 | Yano | .......................... F16F 1/20 |
| 2014/0312543 | A1 * | 10/2014 | Nakagawa | ................ F16F 1/20 |
| | | | | 267/158 |

FOREIGN PATENT DOCUMENTS

| CN | 110107629 A | * | 8/2019 |
| CN | 111828521 A | * | 10/2020 |
| JP | 2000193000 A | * | 7/2000 |

(Continued)

*Primary Examiner* — Paul N Dickson
*Assistant Examiner* — Caitlin Anne Miller
(74) *Attorney, Agent, or Firm* — Slater Matsil, LLP

(57) ABSTRACT

A silencer for a leaf spring for a commercial vehicle is provided. The silencer includes an upper rubber body having defined therein a fitting hole into which a second leaf spring is press-fitted, with a top surface of the upper rubber body serving as a contact surface in contact with a first leaf spring, and a lower rubber body having defined therein an accommodation space, with a first buffering protrusion being provided on a bottom surface of the lower rubber body such that a third leaf spring is able to be in contact with the first buffering protrusion.

20 Claims, 7 Drawing Sheets

(58) Field of Classification Search
CPC ......... B60Y 2306/09; F16F 1/20; F16F 1/185; F16F 1/30; F16F 15/085; G10K 11/16
See application file for complete search history.

(56) References Cited

FOREIGN PATENT DOCUMENTS

| | | | | |
|---|---|---|---|---|
| JP | 2007247754 | A | * | 9/2007 |
| JP | 5084539 | B2 | * | 11/2012 |
| JP | 2013113353 | A | * | 6/2013 |
| JP | 2013124686 | A | * | 6/2013 |
| KR | 20040106708 | A | * | 12/2004 |
| KR | 101490734 | B1 | * | 2/2015 |
| KR | 20170055578 | A | * | 5/2017 |

* cited by examiner

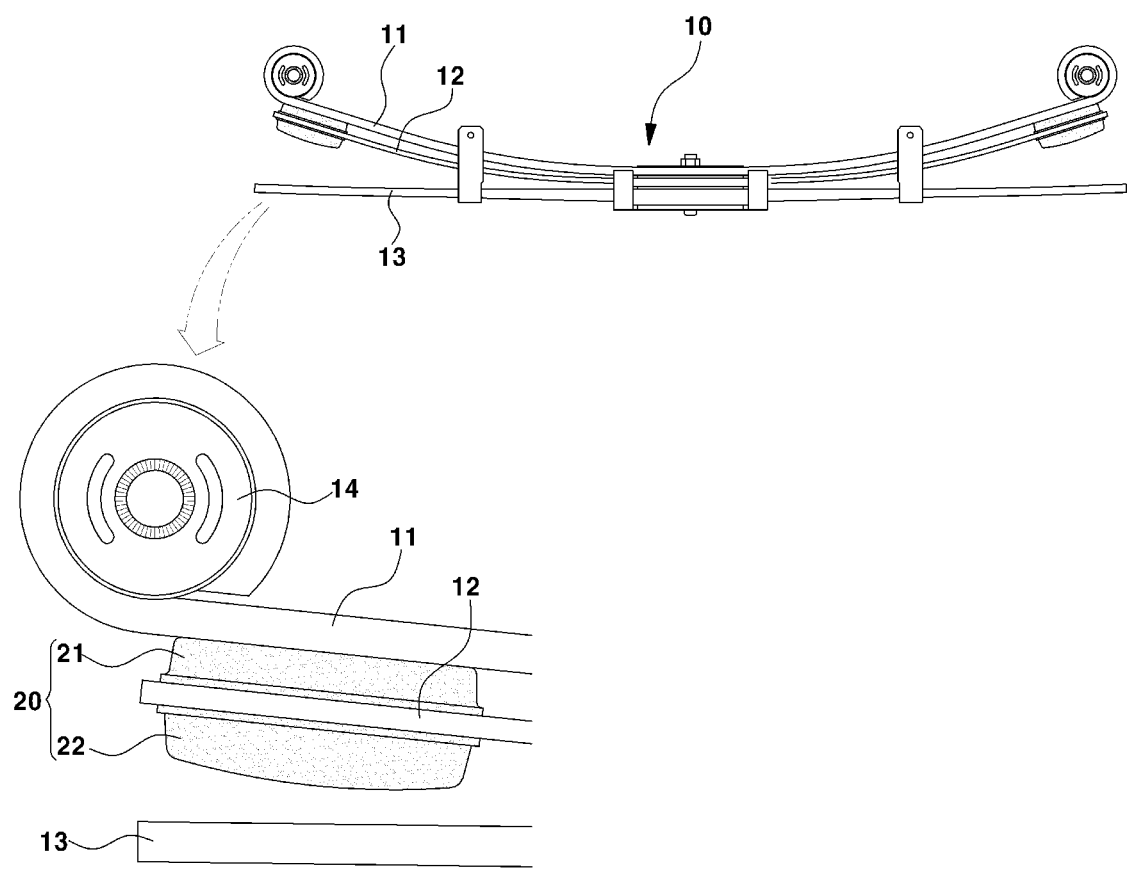
[FIG.1]

[FIG.2]
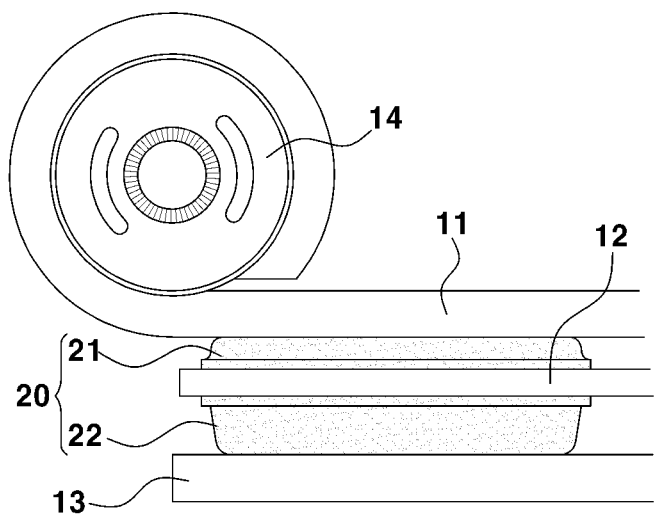
[FIG.3]
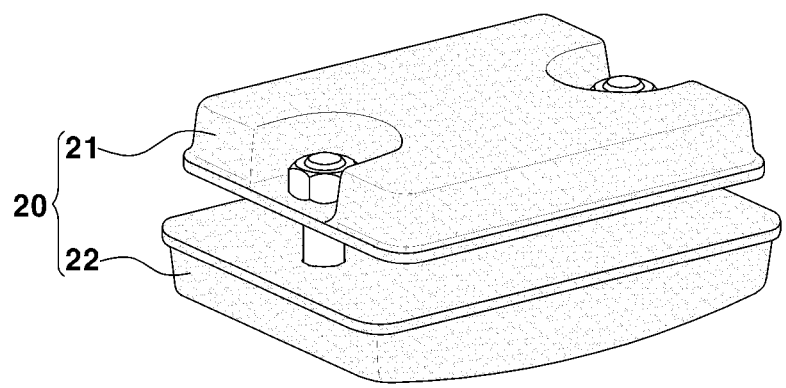

[FIG.4]
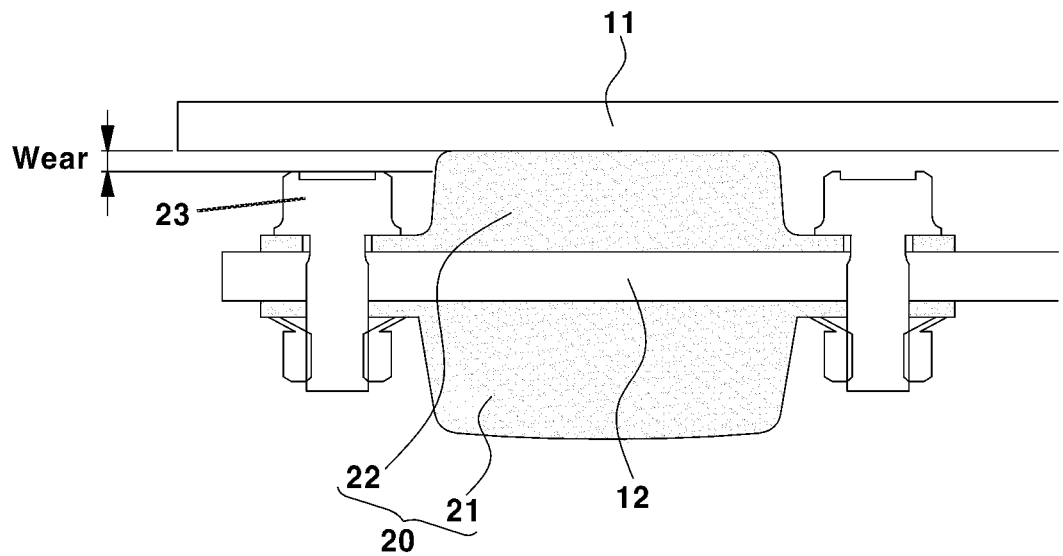
[FIG.5]
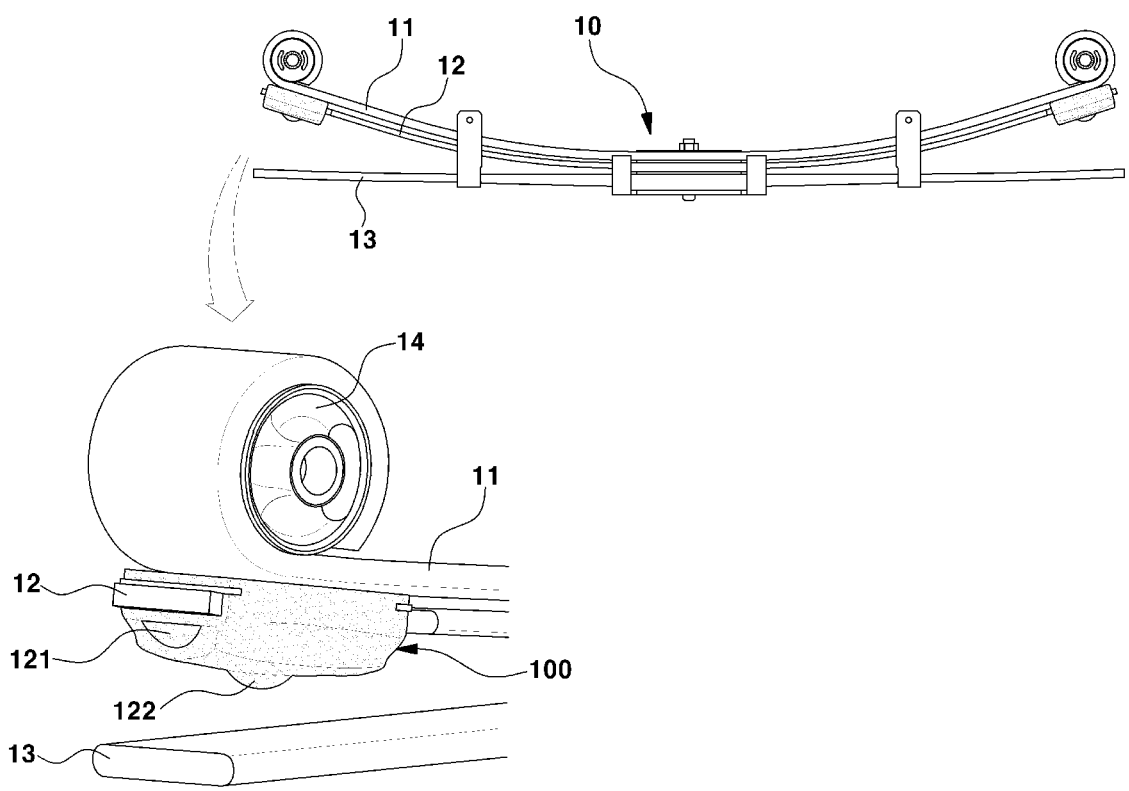

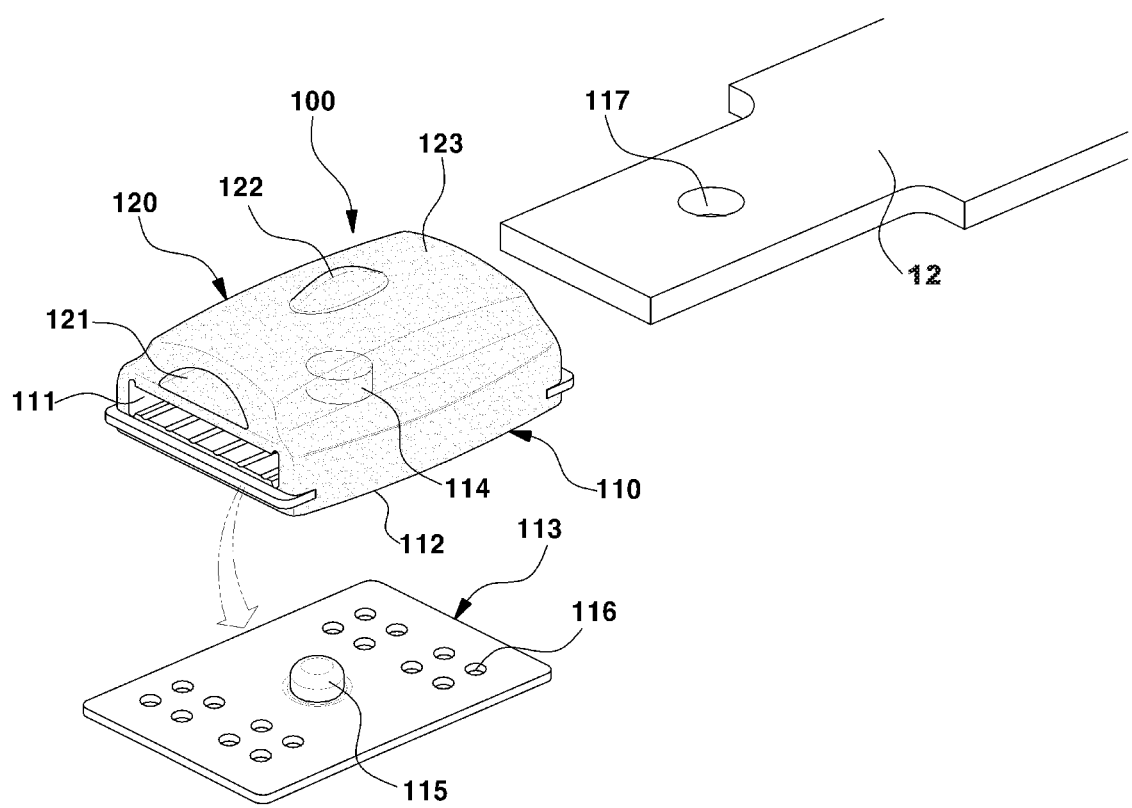
[FIG.6]

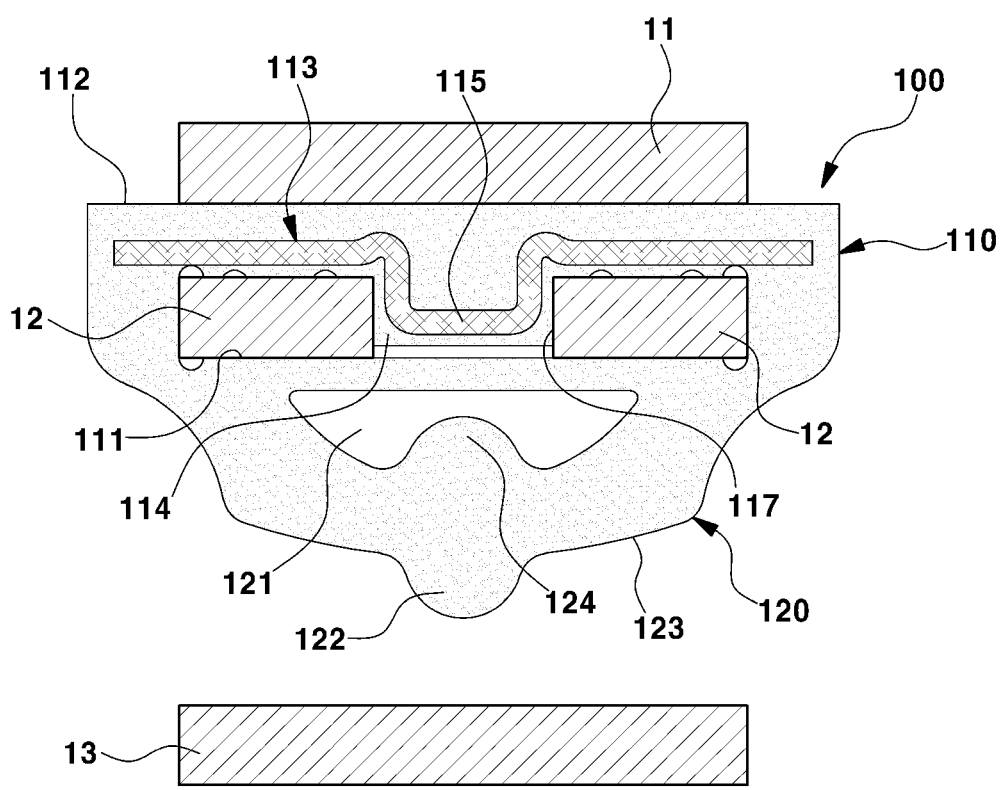
[FIG.7]

[FIG.8]
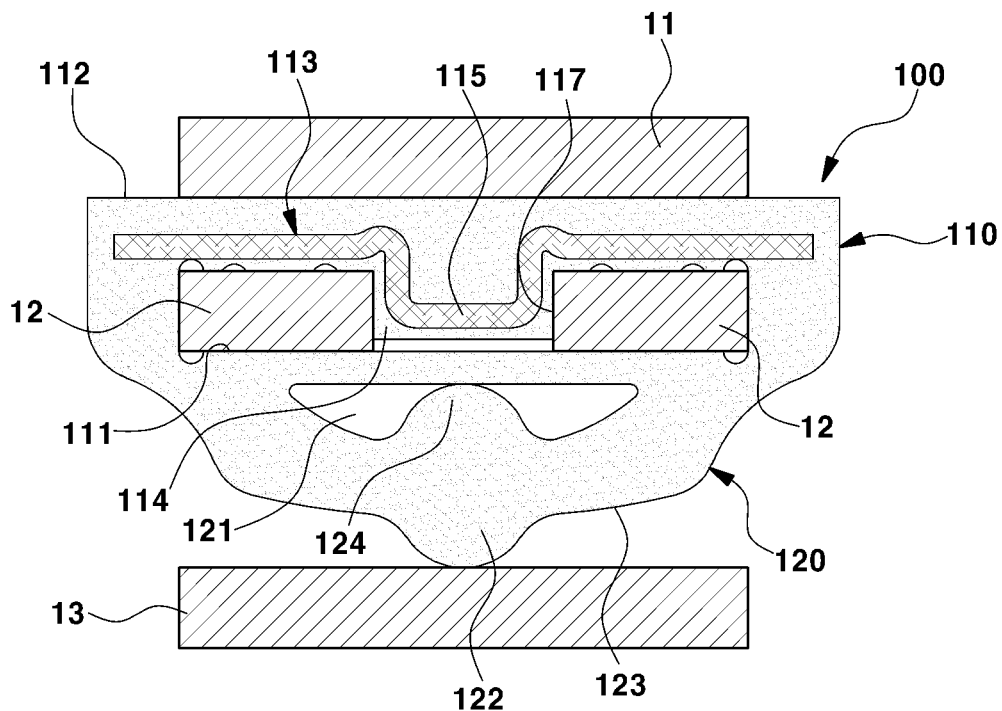
[FIG.9]
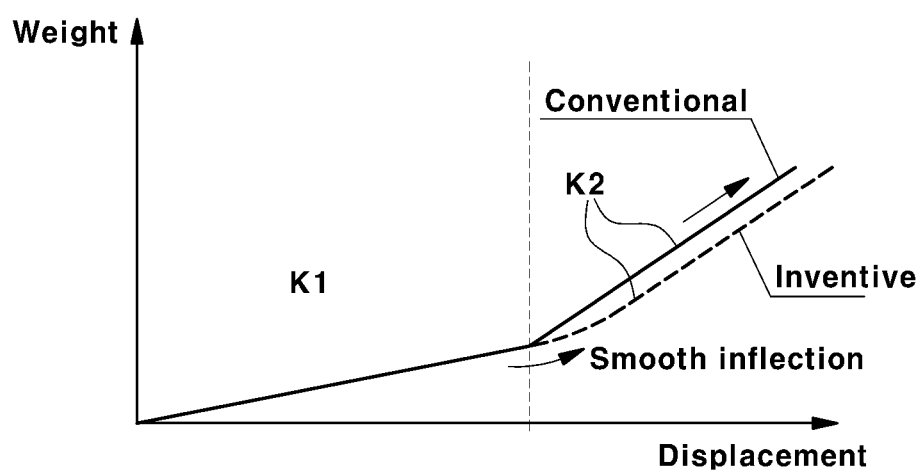

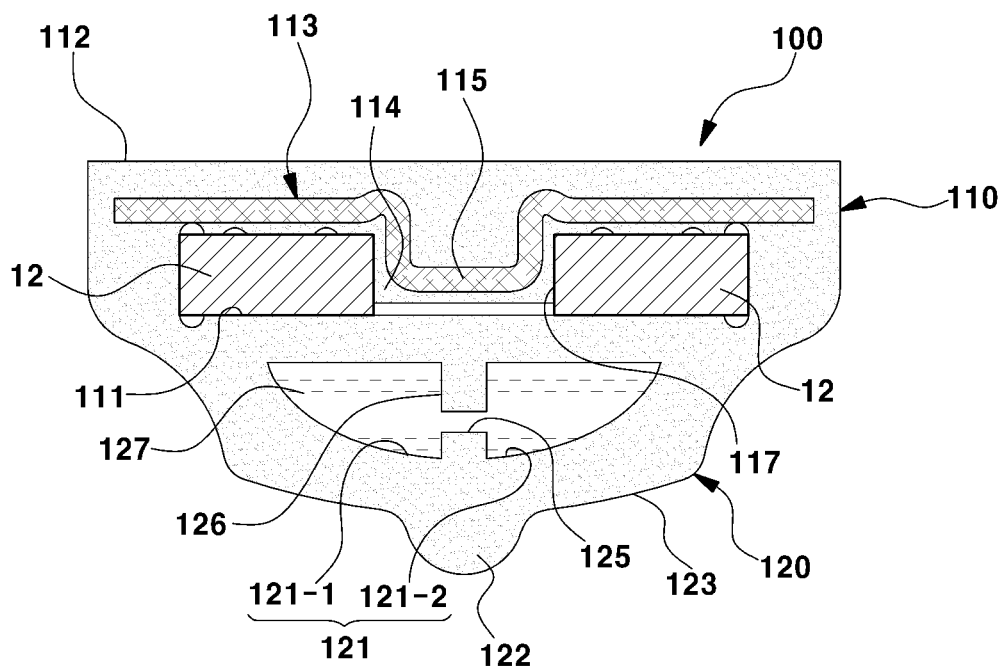
[FIG.10]

SILENCER FOR LEAF SPRING FOR COMMERCIAL VEHICLE

CROSS-REFERENCE TO RELATED APPLICATIONS

This application claims priority to Korean Patent Application No. 10-2019-0152209, filed on Nov. 25, 2019, which application is hereby incorporated herein by reference.

TECHNICAL FIELD

The present invention relates generally to a silencer for a leaf spring for a commercial vehicle.

BACKGROUND

A commercial vehicle uses a leaf spring assembly as a rear wheel suspension to absorb road vibration while supporting a load applied from a cargo area. The leaf spring assembly includes a plurality of leaf springs stacked on each other and bound to both side portions of a rear wheel axle.

Such a leaf spring assembly serves to move up and down together with a rear wheel axle to absorb vibration when rear wheels are repeatedly bumped or rebounded depending on the conditions of the road during driving of a vehicle.

In this case, separate silencers are mounted on both ends of the leaf spring assembly, respectively, to absorb shock while preventing direct contact between leaf springs.

Hereinafter, a related-art configuration comprised of a leaf spring assembly and silencers will be described with reference to attached FIGS. 1 to 4.

As illustrated in FIGS. 1 and 2, a leaf spring assembly 10 includes a first leaf spring 11, a second leaf spring 12, and a third leaf spring 13 stacked on each other, with the third leaf spring 13 being located to be lowest. The first to third leaf springs 11 to 13 are bound together using a binding device. Vehicle mounting bushes 14 are disposed on both ends of the first leaf spring 11, and silencers 20 are disposed on both ends of the second leaf spring 12.

Here, the binding device binds the first leaf spring 11 and the second leaf spring 12 to be curved to be convex downward and the third leaf spring 13 to be disposed to be substantially flat.

Referring to FIGS. 3 and 4, each of the silencers 20 is comprised of an upper rubber member 21 and a lower rubber member 22. The upper rubber member 21 and the lower rubber member 22 are disposed on both sides of the second leaf spring 12 and are bound to each other using bolts 23, such that the upper rubber member 21 is in contact with the bottom surface of the first leaf spring 11 and the lower rubber member 22 is spaced apart from the top surface of the third leaf spring 13 by a predetermined distance.

Accordingly, when a commercial vehicle has no load in the cargo area, the upper rubber member 21 of the silencer 20 is in contact with the bottom surface of the first leaf spring 11 and the lower rubber member 22 remains at the predetermined distance from the top surface of the third leaf spring 13, as illustrated in FIG. 1.

In contrast, when the commercial vehicle has a load having a predetermined or greater weight in the cargo area, both ends of the first and second leaf springs 11 and 12 are deformed downward by the weight of the load, and at the same time, the upper rubber members 21 of the silencers 20 are compressed and the lower rubber members 22 are compressed between the second leaf spring 12 and the third leaf spring 13 to absorb road vibration or the like while supporting the weight of the load, as illustrated in FIG. 2.

In addition, the upper rubber members 21 of the silencers 20 prevent direct contact between the first leaf spring 11 and the second leaf spring 12 to prevent noise, and at the same time, the lower rubber members 22 prevent direct contact between the second leaf spring 12 and the third leaf spring 13 to prevent noise.

The leaf spring assembly 10 as described above is fabricated to have a first spring constant K1 when there is no load and to have a second spring constant K2 when there is a load having a predetermined or greater weight.

The second spring constant K2 may be set to be greater than the first spring constant K1. For example, the first spring constant K1 may be set to be 1.67 kgf/mm, and the second spring constant K2 may be set to be 18.7 kgf/mm.

A point in time at which the first spring constant K1 is transited to the second spring constant K2 during the buffering operation of the leaf spring assembly 10 is a point in time at which the rubber members 21 of the silencers 20 are compressed and the lower rubber members 22 are compressed between the second leaf spring 12 and the third leaf spring 13 by the weight of the load.

Such a significant change in the spring constant during the transition from the first spring constant K1 to the second spring constant K2 may inevitably cause a driver and a passenger to feel a change or a shock, thereby degrading the driving comfort.

In addition, although the silencers 20 are fabricated from plastic or rubber for the buffering operation and a noise prevention operation, the silencers 20 may be worn due to the repetition of the buffering operation, according to limitations in the material properties thereof. In addition, such wear may change the shape of the silencers 20, which is problematic.

Furthermore, when the silencer 20 is excessively worn, the initial thickness of the silencer 20 may not be maintained. When the shape of the silencer 20 is deformed in this manner, the bolts 23 coupling the upper rubber member 21 and the lower rubber member 22 may be released. As illustrated in FIG. 4, wear may cause the bolts 23 to be in direct contact with the first leaf spring 11 positioned directly above the bolts 23, thereby creating steel noise and causing the leaf spring to break, which are problematic.

The information disclosed in this section is only for the enhancement of understanding of the background of the invention, and should not be taken as an acknowledgment or as any form of suggestion that this information forms prior art that would already be known to a person skilled in the art.

SUMMARY

The present invention relates generally to a silencer for a leaf spring for a commercial vehicle. Particular embodiments relate to a silencer for a leaf spring for a commercial vehicle, the silencer being able to perform a buffering function and a noise prevention function when a leaf spring moves up and down to improve the riding comfort of a commercial vehicle.

Embodiments of the present invention have been made keeping in mind problems occurring in the related art. Embodiments of the present invention propose a silencer for a leaf spring for a commercial vehicle, the silencer being able to easily perform a buffering function and a noise prevention function when a leaf spring moves up and down and to prevent wear and deformations in the shape.

According to one embodiment of the present invention, a silencer for a leaf spring for a commercial vehicle is provided. The silencer may include: an upper rubber body having defined therein a fitting hole into which a second leaf spring is press-fitted, with a top surface of the upper rubber body serving as a contact surface in contact with a first leaf spring, and a lower rubber body having defined therein an accommodation space, with a first buffering protrusion being provided on a bottom surface of the lower rubber body such that a third leaf spring is able to be in contact with the first buffering protrusion.

In addition, a metal insert may be accommodated within the upper rubber body to support the second leaf spring press-fitted into the fitting hole and to reinforce the upper rubber body.

A position fixing protrusion may be provided on a central portion of the metal insert, such that a locking protrusion protrudes from a top surface of the fitting hole into which the second leaf spring is press-fitted.

The metal insert may be provided with a plurality of coupling holes, by which the metal insert is coupled with the upper rubber body in vulcanization molding of the silencer.

A locking hole may be provided in the second leaf spring, such that the locking protrusion is inserted into the locking protrusion in a locking manner.

The bottom surface of the lower rubber body may be an inclined surface inclined downward toward the first buffering protrusion.

In particular, a second buffering protrusion may be further provided on a bottom surface of the buffering space of the lower rubber body to have a convex shape extending upward, at a location aligned with the first buffering protrusion in a top-bottom direction.

In addition, a partition having a passage may be provided in the buffering space of the lower rubber body to divide the buffering space into a left buffering space and a right buffering space in which fluid is contained.

Embodiments of the present invention provide the following advantageous effects using the above described features.

First, the features according to embodiments of the present invention first allow the first buffering protrusion to be in contact with the third leaf spring and the lower rubber body to be compressed and deformed at the event of a bumping behavior of driving wheels, thereby easily performing a buffering function and a noise prevention function.

Second, at a moment that the silencer is detached from the third leaf spring at the event of a rebounding behavior of the driving wheels, the silencer may be easily restored to the original shape due to the elastic restoring force of the buffering space and the first and second buffering protrusions of the lower rubber body, so that wear and shape changes can be advantageously prevented.

Third, since the metal insert is accommodated inside of the upper rubber body of the silencer, the strength of the silencer can be maintained and the supporting force of the silencer for holding the second leaf spring can be increased.

Fourth, differently from the related-art structure in which the upper rubber member and the lower rubber member of the silencer are provided as separate pieces and bound together by bolting, the upper rubber body and the lower rubber body of the silencer are integrated by vulcanization molding. Accordingly, it is possible to fundamentally prevent direct contact between the metal components (e.g. the bolts and the leaf springs), thereby preventing noise and preventing the leaf springs from breaking.

BRIEF DESCRIPTION OF THE DRAWINGS

The above and other objectives, features, and advantages of the present invention will be more clearly understood from the following detailed description when taken in conjunction with the accompanying drawings, in which:

FIGS. 1 and 2 are side views illustrating a related-art configuration comprised of a leaf spring assembly and silencers;

FIG. 3 is a perspective view illustrating a related-art silencer;

FIG. 4 is a cross-sectional view illustrating the related-art silencer mounted to the second leaf spring by bolting;

FIG. 5 is a perspective view illustrating a silencer according to embodiments of the present invention mounted on a leaf spring;

FIG. 6 is an exploded perspective view illustrating a silencer according to embodiments of the present invention before being mounted on a leaf spring;

FIG. 7 is a cross-sectional view illustrating a silencer according to embodiments of the present invention mounted on a leaf spring;

FIG. 8 is a cross-sectional view illustrating a bump operation of a silencer according to embodiments of the present invention;

FIG. 9 is a graph comparing variations in the spring constant of the leaf spring during the bump operation of the silencer according to embodiments of the present invention with variations in the spring constant of the leaf spring during the bump operation of a related-art silencer; and FIG. 10 is a cross-sectional view illustrating a silencer according to another embodiment of the present invention.

DETAILED DESCRIPTION OF ILLUSTRATIVE EMBODIMENTS

Hereinafter, exemplary embodiments of the present invention will be described in detail with reference to the accompanying drawings.

FIG. 5 is a perspective view illustrating a silencer according to embodiments of the present invention mounted on a leaf spring, FIG. 6 is an exploded perspective view illustrating a silencer according to embodiments of the present invention before being mounted on a leaf spring, and FIG. 7 is a cross-sectional view illustrating a silencer according to embodiments of the present invention mounted on a leaf spring.

As illustrated in FIG. 5, a leaf spring assembly 10 includes a first leaf spring 11, a second leaf spring 12, and a third leaf spring 13 stacked on each other, with the third leaf spring 13 being located to be lowest. The first to third leaf springs 11 to 13 are bound together using a binding device. Vehicle mounting bushes 14 are disposed on both ends of the first leaf spring 11, and silencers 100 are disposed on both ends of the second leaf spring 12.

Here, the binding device binds the first leaf spring 11 and the second leaf spring 12 to be curved in a convex shape extending downward and the third leaf spring 13 to be disposed to be substantially flat.

Each of the silencers 100 includes an upper rubber body no and a lower rubber body 120 integrated by vulcanization molding. The upper rubber body 110 is fastened to the second leaf spring 12, and the lower rubber body 120 is spaced apart from the third leaf spring 13 such that the third leaf spring 13 may come into contact with the lower rubber body 120.

Referring to FIGS. 6 and 7, a fitting hole 111 is provided inside of the upper rubber body no, such that the second leaf spring 12 is press-fitted into the fitting hole 111. The top surface of the upper rubber body no is provided as a flat contact surface 112 in contact with the first leaf spring 11.

In addition, a metal insert 113 is accommodated inside of the upper rubber body no to support the second leaf spring 12 press-fitted into the fitting hole 111 and to reinforce the strength of the upper rubber body 110.

In a case in which the silencer 100 is fabricated using a vulcanization mold, when the metal insert 113 is placed within the mold, the metal insert 113 may be present within the upper rubber body 110 of the silencer 100 after the completion of the vulcanization molding.

As illustrated in FIG. 6, a position fixing protrusion 115 is provided on the central portion of the metal insert 113, such that a locking protrusion 114 protrudes from the top surface of the fitting hole 111 into which the second leaf spring 12 is press-fitted.

The metal insert 113 may have a plurality of coupling holes 116, by which the metal insert 113 is coupled with the upper rubber body 110 in the vulcanization molding of the silencer 100.

In addition, a locking hole 117 is provided in the second leaf spring 12, such that the locking protrusion 114 is inserted into the locking hole 117 in a locking manner.

Accordingly, when the second leaf spring 12 is press-fitted into the fitting hole in provided in the upper rubber body no, the locking protrusion 114 is inserted into the locking hole 117 of the second leaf spring 12 in a locking manner, as illustrated in FIG. 7, so that the silencer 100 is completely mounted on the second leaf spring 12.

The accommodation of the metal insert 113 in the upper rubber body no of the silencer 100 as described above can increase supporting force to maintain the strength of the silencer 100 and hold the second leaf spring 12.

In addition, differently from the related-art structure in which the upper rubber member and the lower rubber member of the silencer are bolted, the upper rubber body no and the lower rubber body 120 of the silencer 100 according to embodiments of the present invention are provided integrally by vulcanization molding. Accordingly, it is possible to fundamentally prevent direct contact between the metal components (e.g. the bolts and the leaf springs), thereby preventing noise and preventing the leaf springs from breaking.

A hollow buffering space 121 is provided inside of the lower rubber body 120 of the silencer 100. A first buffering protrusion 122 protrudes downward from the bottom surface of the lower rubber body 120, and the third leaf spring 13 can come into contact with the first buffering protrusion 122.

In addition, the bottom portion of the lower rubber body 120 is provided as an inclined surface 123 inclined downward toward the first buffering protrusion 122. The inclined surface 123 is provided to reduce stress when a load is input via the bottom surface of the lower rubber body 120.

In addition, a second buffering protrusion 124 is further provided on the bottom surface of the buffering space 121 of the lower rubber body 120, the second buffering protrusion 124 having a convex shape extending upward. The second buffering protrusion 124 is provided at a location aligned with the first buffering protrusion 122 in a top-bottom direction. As illustrated in FIG. 7, the second buffering protrusion 124 remains spaced apart from the top surface of the buffering space 121 before the lower rubber body 120 is compressed to perform the buffering function.

A flow of the operation of the silencer according to embodiments of the present invention having the above-described configuration will be described as follows.

When driving wheels (or tires of the driving wheels) are repeatedly bumped (moved upwards) or rebounded (moved downwards) depending on the road conditions during the driving of a vehicle, the leaf spring assembly 10 moves up or down along with the rear wheel axle of the vehicle to absorb road vibration.

During the bumping behavior, the central portion of the leaf spring assembly 10 moves upwards to reduce the distance between the second leaf spring 12 and the third leaf spring 13, so that the silencers 100 mounted on both end portions of the second leaf spring 12 come into contact with the third leaf spring 13 to perform the buffering function.

More specifically, as illustrated in FIG. 8, first, the first buffering protrusion 122 provided in the lower rubber body 120 of each of the silencers 100 is brought into contact with the top surface of the third leaf spring 13 to perform a first buffering operation to absorb shock caused by the bumping behavior. Subsequently, the lower rubber body 120 is compressed and, at the same time, the height of the buffering space 121 is reduced, so that the second buffering protrusion 124 is brought into contact with the top surface of the buffering space 121 to perform a second buffering operation to absorb the shock.

In addition, the inclined surface 123 of the lower rubber body 120 serves to disperse stress caused by the input of a load in response to the bumping behavior, although the inclined surface 123 is not in direct contact with the top surface of the third leaf spring 13.

As described above, the multistage buffering operation of the silencer 100, including the operation of the first buffering protrusion 122 being in contact with the third leaf spring 13, the operation of the lower rubber body 120 being compressed and deformed, the operation of the second buffering protrusion 124 being in contact with the top surface of the buffering space 121, and the stress dispersing operation of inclined surface 123, can easily buffer the bumping shock.

Since the spring constant of the leaf spring assembly 10 is transited from the first spring constant K1 to the second spring constant K2, which is greater than the first spring constant K1, the spring constant changes along an inflection section, which is smoother than that of the related art, due to the above-described operations, including the operation in which the first buffering protrusion 122 is in contact with the third leaf spring 13, the operation in which the lower rubber body 120 is compressed and deformed while the second buffering protrusion 124 is in contact with the top surface of the buffering space 121, and the stress dispersion of the inclined surface 123.

More specifically, in the related art, the spring constant of the leaf spring assembly 10 is transited sharply from the first spring constant K1 to the second spring constant K2, as illustrated in FIG. 9. In contrast, according to embodiments of the present invention, due to the multistage operation of the silencer 100 as described above, the spring constant is transited from the first spring constant K1 to the second spring constant K2 along the smooth inflection section, so that the spontaneous concentration of a load to the leaf spring assembly 10 can be reduced, thereby improving the endurance of the leaf spring assembly 10.

In contrast, in the rebounding behavior, the central portion of the leaf spring assembly 10 moves downward to increase the distance between the second leaf spring 12 and the third leaf spring 13, so that the silencers 100 mounted on both end portions of the second leaf spring 12 are spaced apart from the third leaf spring 13 again.

At the same time, the lower rubber body 120 that has been compressed during the bumping behavior is easily restored to the original position by elastic restoring force, and the spring constant of the leaf spring assembly 10 is restored from the second spring constant K2 to the first spring constant K1.

According to another embodiment of the present invention as illustrated in FIG. 10, a partition 126 having a passage 125 may further be provided in the buffering space 121 of the lower rubber body 120. Fluid 127 may be contained in a left buffering space 121-1 and a right buffering space 121-2 of the buffering space 121, divided by the partition 126.

Since the fluid 127 is contained in the buffering space 121 of the lower rubber body 120, when the lower rubber body 120 is compressed and deformed, the fluid 127 may be spread to the left buffering space 121-1 and the right buffering space 121-2 to perform a buffering operation.

Accordingly, a load concentrated to the lower rubber body 120 during the compression and deformation of the lower rubber body 120 may be dispersed to the fluid 127. In addition, noise that would occur during compression and deformation of the lower rubber body 120 can be absorbed by the fluid 127, thereby contributing to the improvement of noise, vibration, and harshness (NVH) performance.

Although the exemplary embodiments of the present invention have been described for illustrative purposes, those skilled in the art will appreciate that various modifications, additions and substitutions are possible, without departing from the scope and spirit of the present invention as disclosed in the accompanying claims.

What is claimed is:

1. A silencer for a leaf spring for a commercial vehicle, the silencer comprising:
   an upper rubber body having defined therein a fitting hole into which a second leaf spring is press-fitted, with a top surface of the upper rubber body serving as a contact surface in contact with a first leaf spring; and
   a lower rubber body having defined therein a buffering space, with a first buffering protrusion being provided on a bottom surface of the lower rubber body such that a third leaf spring is able to be in contact with the first buffering protrusion.

2. The silencer according to claim 1, further comprising a metal insert accommodated within the upper rubber body, wherein the metal insert is configured to support the second leaf spring press-fitted into the fitting hole and to reinforce the upper rubber body.

3. The silencer according to claim 2, further comprising a plurality of coupling holes provided in the metal insert, wherein the plurality of coupling holes are coupled with the upper rubber body.

4. The silencer according to claim 2, further comprising a position fixing protrusion provided on a central portion of the metal insert, wherein a locking protrusion protrudes from a top surface of the fitting hole into which the second leaf spring is press-fitted.

5. The silencer according to claim 4, further comprising a locking hole provided in the second leaf spring, wherein the locking protrusion is inserted into the locking protrusion in a locking manner.

6. The silencer according to claim 1, wherein the bottom surface of the lower rubber body comprises an inclined surface inclined downward toward the first buffering protrusion.

7. The silencer according to claim 1, further comprising a second buffering protrusion provided on a bottom surface of the buffering space of the lower rubber body, the second buffering protrusion having a convex shape extending upward at a location aligned with the first buffering protrusion in a top-bottom direction.

8. The silencer according to claim 1, further comprising a partition having a passage provided in the buffering space of the lower rubber body, wherein the partition divides the buffering space into a left buffering space and a right buffering space.

9. The silencer according to claim 8, further comprising fluid in the left buffering space and the right buffering space.

10. A vehicle comprising:
    a leaf spring assembly comprising a first leaf spring, a second leaf spring, and a third leaf spring; and
    a silencer attached to the leaf spring assembly, the silencer comprising:
       an upper rubber body including a fitting hole, wherein the second leaf spring is press-fitted in the fitting hole, and wherein a top surface of the upper rubber body contacts the first leaf spring; and
       a lower rubber body including a buffering space and a first buffering protrusion on a bottom surface of the lower rubber body, wherein the first buffering protrusion is configured to be able to contact the third leaf spring.

11. The vehicle according to claim 10, further comprising vehicle mounting bushes disposed at both ends of the second leaf spring.

12. The vehicle according to claim 10, further comprising a metal insert disposed inside the upper rubber body, wherein the metal insert supports the second leaf spring.

13. The vehicle according to claim 12, further comprising:
    a position fixing protrusion on a central portion of the metal insert;
    a locking protrusion protruding from a top surface of the fitting hole; and
    a plurality of coupling holes in the metal insert.

14. The vehicle according to claim 13, further comprising a locking hole in the second leaf spring, wherein the locking protrusion is inserted into the locking hole.

15. The vehicle according to claim 10, wherein the silencer is formed using a vulcanization mold.

16. The vehicle of claim 10, further comprising:
    a second buffering protrusion provided on a bottom surface of the buffering space and aligned with the first buffering protrusion in a top-bottom direction.

17. The vehicle of claim 10, further comprising:
    a partition provided in the buffering space, the partition having a passage and dividing the buffering space into a left buffering space and a right buffering space; and
    a fluid contained in the left buffering space and the right buffering space.

18. The vehicle of claim 10, further comprising an inclined surface on a bottom surface of the lower rubber body, the inclined surface being inclined downward toward the first buffering protrusion.

19. A method of performing a multistage buffering operation of a silencer mounted on a leaf spring assembly comprising a first leaf spring, a second leaf spring, and a third leaf spring bonded in a stack, the method comprising:
    during a bumping behavior, performing a first buffering operation comprising bringing a first buffering protrusion provided in a lower rubber body of the silencer into contact with a top surface of the third leaf spring; and during the bumping behavior, performing a second buffering operation comprising compressing the lower rubber body, reducing a height of a buffering space provided in the lower rubber body, and bringing a second buffering protrusion provided at a bottom surface of the lower rubber body into contact with a top surface of the buffering space.

20. The method of claim 19, further comprising:

during a rebounding behavior, moving a central portion of the leaf spring assembly downward to increase a distance between the second leaf spring and the third leaf spring;

during the rebounding behavior, restoring the lower rubber body to its original position; and during the rebounding behavior, restoring a spring constant of the leaf spring assembly.

\* \* \* \* \*